US012627349B2

(12) United States Patent
Su et al.

(10) Patent No.: US 12,627,349 B2
(45) Date of Patent: May 12, 2026

(54) INFORMATION REPORTING AND RECEIVING METHOD, TERMINAL DEVICE AND NETWORK DEVICE

(71) Applicant: DATANG MOBILE COMMUNICATIONS EQUIPMENT CO., LTD., Beijing (CN)

(72) Inventors: Xin Su, Beijing (CN); Qiubin Gao, Beijing (CN); Lei Song, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 322 days.

(21) Appl. No.: 18/260,028

(22) PCT Filed: Dec. 24, 2021

(86) PCT No.: PCT/CN2021/141162
§ 371 (c)(1),
(2) Date: Jun. 29, 2023

(87) PCT Pub. No.: WO2022/151952
PCT Pub. Date: Jul. 21, 2022

(65) Prior Publication Data
US 2024/0080077 A1 Mar. 7, 2024

(30) Foreign Application Priority Data
Jan. 15, 2021 (CN) .......................... 202110057661.8

(51) Int. Cl.
*H04B 7/06* (2006.01)
*H04W 24/10* (2009.01)
(52) U.S. Cl.
CPC .......... *H04B 7/0626* (2013.01); *H04W 24/10* (2013.01)

(58) Field of Classification Search
None
See application file for complete search history.

(56) References Cited

U.S. PATENT DOCUMENTS

2015/0201346 A1* 7/2015 Wu ....................... H04L 5/0048
                                                          370/252
2019/0089437 A1 3/2019 Chen et al.
                    (Continued)

FOREIGN PATENT DOCUMENTS

CN        110798894 A    2/2020
CN        111614389 A    9/2020
                    (Continued)

OTHER PUBLICATIONS

International Search Report for PCT Application No. PCT/CN2021/141162 issued on Mar. 9, 2022 and its English Translation provided by WIPO.
                    (Continued)

*Primary Examiner* — Hong S Cho
(74) *Attorney, Agent, or Firm* — Ladas & Parry, LLP

(57) ABSTRACT
An information reporting and receiving method, a terminal device and a network device are provided in the present disclosure. The information reporting method, performed by the terminal device, which includes: acquiring resource configuration information for channel measurement, where the resource configuration information indicates at least two resource groups and resources included in each resource group; determining reporting configuration of channel state information (CSI); acquiring at least one CSI according to the resource configuration information and the reporting configuration; sending a target CSI to a network device according to the at least one CSI, where the target CSI includes first information, and the first information indicates a target resource and a type of transmission mode recom-
(Continued)

acquiring resource configuration information for channel measurement — S301 determining reporting configuration of channel state information (CSI) — S302 acquiring at least one CSI according to the resource configuration information and the reporting configuration — S303 sending a target CSI to a network device according to the at least one CSI — S304 mended by a terminal, where the target resource includes: at least one resource or a combination of at least two resources.

20 Claims, 4 Drawing Sheets

(56) References Cited

U.S. PATENT DOCUMENTS

| | | | |
|---|---|---|---|
| 2019/0260452 A1 | 8/2019 | Zhang et al. | |
| 2020/0288340 A1* | 9/2020 | Sadeghi | H04W 72/0446 |
| 2022/0053359 A1 | 2/2022 | Song et al. | |
| 2022/0386295 A1 | 12/2022 | Zhang et al. | |

FOREIGN PATENT DOCUMENTS

| | | | |
|---|---|---|---|
| CN | 112218327 A | 1/2021 |
| EP | 3598806 A1 | 1/2020 |
| WO | 2018028158 A1 | 2/2018 |
| WO | 2020143613 A1 | 7/2020 |

OTHER PUBLICATIONS

Written Opinion for PCT Application No. PCT/CN2021/141162 issued on Mar. 9, 2022 and its English Translation provided by WIPO.

International Preliminary Report on Patentability for PCT Application No. PCT/CN2021/141162 issued on Jul. 4, 2023 and its English Translation provided by WIPO.

"Summary of CSI enhancements for MTRP and FDD," 3GPP TSG RAN WG1 Meeting #103-e, R1-2009529, E-meeting, Oct. 26-Nov. 13, 2020, Agenda Item: 8.1.4, Source: Huawei, HiSilicon, all pages.

First Chinese Office Action for Chinese Patent Application No. 202110057661.8 issued by the Chinese Patent Office on Feb. 25, 2023 and its English translation provided by the foreign associate.

First Taiwanese Office Action for Taiwanese Patent Application No. 111100007 issued by the Taiwanese Patent Office on Jun. 27, 2022 and its English translation provided by the foreign associate.

* cited by examiner

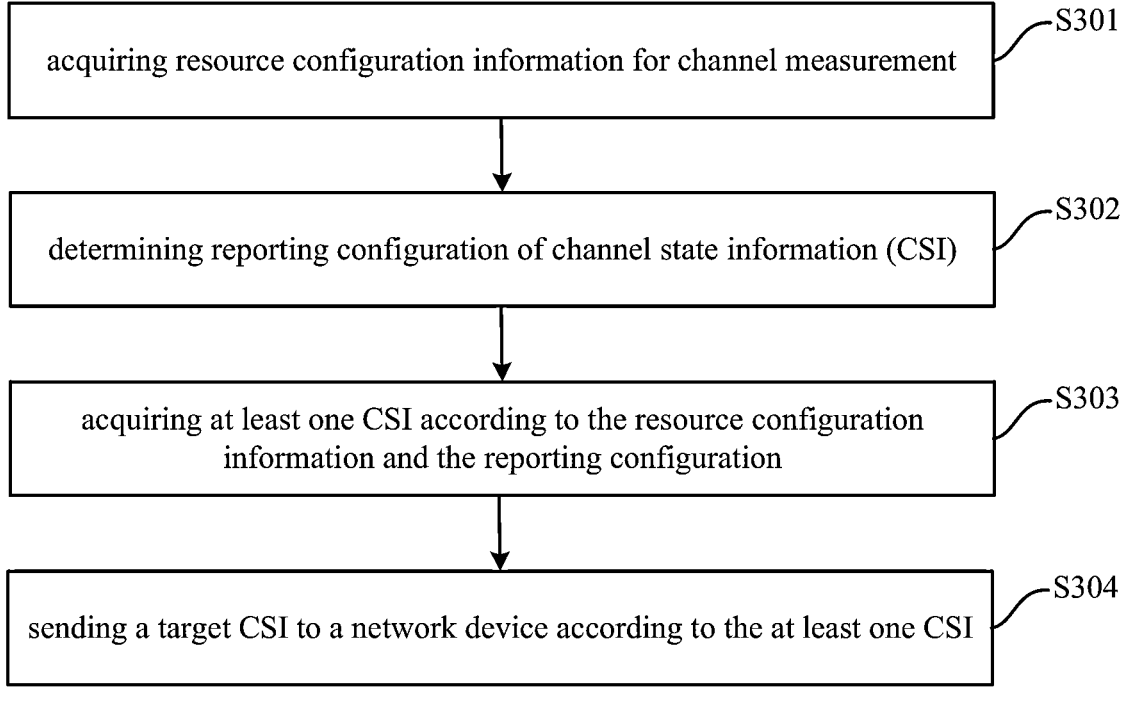

acquiring resource configuration information for channel measurement ~S301 determining reporting configuration of channel state information (CSI) ~S302 acquiring at least one CSI according to the resource configuration information and the reporting configuration ~S303 sending a target CSI to a network device according to the at least one CSI ~S304

FIG.3 receiving target channel state information (CSI) sent by the terminal device ~S401

FIG.4

INFORMATION REPORTING AND RECEIVING METHOD, TERMINAL DEVICE AND NETWORK DEVICE

CROSS-REFERENCE TO RELATED APPLICATIONS

This application is the U.S. national phase of PCT Application No. PCT/CN2021/141162 filed on Dec. 24, 2021, which claims priority to Chinese Patent Application No. 202110057661.8 filed on Jan. 15, 2021, the disclosures of which are incorporated in their entireties by reference herein.

TECHNICAL FIELD

The present disclosure relates to the field of communications technology, and in particular to an information reporting and receiving method, a terminal device and a network device.

BACKGROUND

According to the conclusions of the current standardization discussions, in the process of multiple target reference point (Multiple Target Reference Point, MTRP) channel state information (Channel State Information, CSI) measurement, it is assumed that several resources (resource) in a resource set (resource set) are used as common-mode ratio (Common-Mode Ratio, CMR) of each TRP participating in the collaboration. Based on the measurement of the above-mentioned resources, the terminal calculates and reports the corresponding CSI according to different transmission scheme assumptions.

During the above-mentioned process, issues that have not been clarified include:

1) How to map resource and TRP during the CSI reporting configuration process;

2) In the CSI calculation and reporting by the terminal, how to reflect the corresponding relationship between the CSI, and the TRP and transmission scheme selected by the terminal.

SUMMARY

Embodiments of the present disclosure provide an information reporting and receiving method, a terminal device, and a network device, so as to solve the problem in the related art that in the process of CSI calculation and reporting for coordinated multi-point transmission, the corresponding relationship between CSI and TRP selected by the terminal cannot be reflected, which cannot guarantee the reliability of network transmission.

In order to solve the above-mentioned technical problem, an embodiment of the present disclosure provides an information reporting method, performed by a terminal device, which includes:

acquiring resource configuration information for channel measurement, where the resource configuration information indicates at least two resource groups and resources included in each resource group;

determining reporting configuration of channel state information (CSI);

acquiring at least one CSI according to the resource configuration information and the reporting configuration;

sending a target CSI to a network device according to the at least one CSI, where the target CSI includes first information, and the first information indicates a target resource and a type of transmission mode recommended by a terminal, where the target resource includes: at least one resource or a combination of at least two resources.

Optionally, the acquiring resource configuration information for channel measurement includes:

receiving grouping configuration information sent by the network device;

determining the resource configuration information for channel measurement according to the grouping configuration information.

Further, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Optionally, in a case that the grouping configuration information includes the QCL relationship of resources in the resource set for channel measurement, the determining the resource configuration information for channel measurement according to the grouping configuration information includes:

determining, for a first resource and a second resource in the resource set for channel measurement, that the first resource and the second resource belong to a same resource group in a case that the first resource and the second resource have a first type of QCL relationship with a first reference signal;

where the first type includes one of the following:

Type A;

Type B;

Type C;

Type D;

Type A and Type D; or,

Type C and Type D.

Optionally, the grouping configuration information further includes: identification information indicating resources in a first resource group of the at least two resource groups to acquire CSI in a transmission mode of single-point transmission.

Optionally, configuration mode of the reporting configuration includes at least one of the following:

network device configuration;

predefinition;

terminal reporting configuration; or, determination according to resource configuration information.

Optionally, the reporting configuration includes at least one of the following:

reporting at least one CSI acquired on the basis of a transmission mode of single-point transmission; or, reporting at least one CSI acquired on the basis of a transmission mode of multi-point transmission.

Further, a type of the transmission mode of multi-point transmission includes at least one of the following:

space division multiplexing (SDM);

frequency division multiplexing (FDM) mode A;

FDM mode B;

time division multiplexing TDM mode A;

TDM mode four; or, high-speed rail enhancement mode.

Further, a type of the transmission mode of single-point transmission includes at least one of the following:

dynamic transmission point selection (DPS);

DPS and single-point repeat transmission;

dynamic transmission point become silent (DPB); or,

DPB and single-point repeat transmission.

Optionally, in a case that the reporting configuration includes: reporting at least one CSI acquired on the basis of the transmission mode of multi-point transmission, the acquiring at least one CSI according to the resource configuration information and the reporting configuration includes:

selecting at least two groups from the at least two resource groups, and selecting one resource from each group of the at least two groups to perform channel measurement respectively, and acquiring corresponding CSI.

Optionally, in a case that the reporting configuration includes: reporting at least one CSI acquired on the basis of the transmission mode of single-point transmission, the acquiring at least one CSI according to the resource configuration information and the reporting configuration includes:

selecting a second resource from a first resource to perform channel measurement, and acquiring corresponding CSI, where the first resource is all resources that can be used for CSIs acquired on the basis of the transmission mode of single-point transmission, or the first resource is all resources configured by the network device.

Optionally, in a case that the reporting configuration includes: reporting at least one CSI acquired on the basis of the transmission mode of single-point transmission, the target CSI includes $X_1$ first information, each of the first information is configured to identify one of combinations of $Y_1$ resources and $Z_1$ types of transmission modes of single-point transmission, or, each of the first information corresponds to one resource in one resource group;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

Further, in a case that each of the first information is configured to identify one of combinations of $Y_1$ resources and $Z_1$ types of transmission modes of single-point transmission, total number of bits occupied by the first information in the target CSI is: $X_1 \times \lceil \log_2 Y_1 Z_1 \rceil$.

Further, in a case that each of the first information corresponds to one resource in one resource group, the total number of bits occupied by the first information in the target CSI is: a sum of number of bits occupied by each resource group.

Specially, the number of bits occupied by each resource group is $\lceil \log_2 N_x \rceil$, and $N_x$ is a quantity of resources in the $x_{th}$ resource group.

Optionally, in a case that the reporting configuration includes: reporting at least one CSI acquired on the basis of the transmission mode of single-point transmission, the target CSI includes one first information, the first information is configured to identify $X_1$ combinations selected from combinations of $Y_1$ resources and $Z_1$ types of transmission modes of single-point transmission, or, the first information is configured to identify a combination of one resource selected from a plurality of resource groups respectively, where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

Further, in a case that the first information is configured to identify $X_1$ combinations selected from combinations of $Y_1$ resources and $Z_1$ types of transmission modes of single-point transmission, total number of bits occupied by the first information in the target CSI is:

$$\lceil \log_2 C_{Y_1 Z_1}^{X_1} \rceil,$$

where $$C_{Y_1 Z_1}^{X_1}$$

is a quantity of combinations of $X_1$ elements selected from $Y_1 Z_1$ elements.

Further, in a case that the first information is configured to identify the combination of one resource selected from the plurality of resource groups respectively, total number of bits occupied by the first information in the target CSI is: $\lceil \log_2 N_1 \times \ldots \times N_x \rceil$, where $N_1$ is a quantity of resources in a first resource group, and $N_x$ is a quantity of resources in the $x_{th}$ resource group.

Optionally, in a case that the reporting configuration includes: reporting at least one CSI acquired on the basis of the transmission mode of multi-point transmission, the target CSI includes $X_2$ first information, each of the first information is configured to identify one of combinations of $Y_2$ resource combinations and $Z_2$ types of transmission modes of multi-point transmission;

where $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

Further, total number of bits occupied by the first information in the target CSI is: $X_2 \times \lceil \log_2 Y_2 Z_2 \rceil$.

Optionally, in a case that the reporting configuration includes: reporting at least one CSI acquired on the basis of the transmission mode of multi-point transmission, the target CSI includes one first information, the first information is configured to identify $X_2$ combinations selected from the combinations of $Y_2$ resource combinations and $Z_2$ types of transmission modes of multi-point transmission;

where $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

Further, total number of bits occupied by the first information in the target CSI is:

$$\lceil \log_2 C_{Y_2 Z_2}^{X_2} \rceil,$$

where $$C_{Y_2 Z_2}^{X_2}$$

is a quantity of combinations of $X_2$ elements selected from $Y_2 Z_2$ elements.

Optionally, in a case that the reporting configuration includes: reporting at least one CSI acquired on the basis of the transmission mode of single-point transmission and reporting at least one CSI acquired on the basis of the transmission mode of multi-point transmission, the target CSI includes $X_1 + X_2$ first information, where each first information of $X_1$ first information is configured to identify one of the combinations of $Y_1$ resources and $Z_1$ types of transmission modes of single-point transmission, and each first information of $X_2$ first information is configured to identify one of the combinations of $Y_2$ resources and $Z_2$ types of transmission modes of multi-point transmission;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_1$, $Y_1$, $Z_1$, $X_2$, $Y_2$ and $Z_2$ are all positive integers.

Further, number of bits occupied by the first information in the target CSI is: $X_1 \times \lceil \log_2 Y_1 Z_1 \rceil + X_2 \times \lceil \log_2 Y_2 Z_2 \rceil$.

Optionally, in a case that the reporting configuration includes: reporting at least one CSI acquired on the basis of the transmission mode of single-point transmission and reporting at least one CSI acquired on the basis of the transmission mode of multi-point transmission, the target CSI includes one first information; the first information is configured to identify $X_1$ combinations selected from the combinations of $Y_1$ resources and $Z_1$ types of transmission modes of single-point transmission, and $X_2$ combinations selected from the combinations of $Y_2$ resource combinations and $Z_2$ types of transmission modes of multi-point transmission;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_2$ is a quantity of CSIs acquired on the basis of the transmission mode of multi-point transmission;

6

$Y_2$ is a quantity of resource combinations that can be used for CSIs acquired on the basis of the transmission mode of multi-point transmission;

$Z_2$ is a quantity of types of the transmission modes of multi-point transmission;

$X_1$, $Y_1$, $Z_1$, $X_2$, $Y_2$ and $Z_2$ are all positive integers.

Further, the number of bits occupied by the first information in the target CSI is:

$$\lceil \log_2 (C_{Y_1 Z_1}^{X_1} C_{Y_2 Z_2}^{X_2}) \rceil,$$

where $$C_{Y_1 Z_1}^{X_1}$$

is a quantity of combinations of $X_1$ elements selected from $Y_1 Z_1$ elements; and $$C_{Y_2 Z_2}^{X_2}$$

is a quantity of combinations of $X_2$ elements selected from $Y_2 Z_2$ elements.

Specially, the first information is a channel state information reference signal resource indicator (CRI).

An embodiment of the present disclosure also provides an information receiving method, performed by a network device, which includes:

receiving target channel state information (CSI) sent by the terminal device, where a target CSI includes first information, and the first information indicates a target resource and a type of transmission mode recommended by the terminal;

where the target resource includes: at least one resource or a combination of at least two resources;

the target CSI is determined by the terminal device according to resource configuration information for channel measurement and at least one CSI acquired by CSI reporting configuration, and the resource configuration information indicates at least two resource groups and resources included in each resource group.

Optionally, prior to the receiving the target channel state information (CSI) sent by the terminal device, further includes:

sending grouping configuration information to the terminal device, where the grouping configuration information is configured to determine the resource configuration information by the terminal device.

Optionally, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Optionally, the grouping configuration information further includes: identification information indicating resources in a first resource group of the at least two resource groups to acquire CSI in a transmission mode of single-point transmission.

An embodiment of the present disclosure also provides a terminal device, includes a memory, a transceiver, and a processor, where the memory is configured to store computer programs; the transceiver is configured to send and receive data under the control of the processor; and the processor is configured to read the computer programs in the memory and perform the following operations of:

acquiring resource configuration information for channel measurement, where the resource configuration information indicates at least two resource groups and resources included in each resource group;

determining reporting configuration of channel state information (CSI);

acquiring at least one CSI according to the resource configuration information and the reporting configuration;

sending a target CSI to a network device according to the at least one CSI, where the target CSI includes first information, and the first information indicates a target resource and a type of transmission mode recommended by a terminal, where the target resource includes: at least one resource or a combination of at least two resources.

An embodiment of the present disclosure also provides a terminal device, which includes:

a first acquiring unit, configured to acquire resource configuration information for channel measurement, where the resource configuration information indicates at least two resource groups and resources included in each resource group;

a determining unit, configured to determine reporting configuration of channel state information (CSI);

a second acquiring unit, configured to acquire at least one CSI according to the resource configuration information and the reporting configuration;

a first sending unit, configured to send, according to the at least one CSI, a target CSI to a network device, where the target CSI includes first information, and the first information indicates a target resource and a type of transmission mode recommended by a terminal, where the target resource includes: at least one resource or a combination of at least two resources.

An embodiment of the present disclosure also provides a network device, which includes a memory, a transceiver, and a processor, where the memory is configured to store computer programs; the transceiver is configured to send and receive data under control of the processor; and the processor is configured to read the computer programs in the memory and perform the following operations of:

receiving, through the transceiver, target channel state information (CSI) sent by the terminal device, where a target CSI includes first information, and the first information indicates a target resource and a type of transmission mode recommended by the terminal;

where the target resource includes: at least one resource or a combination of at least two resources;

the target CSI is determined by the terminal device according to resource configuration information for channel measurement and at least one CSI acquired by CSI reporting configuration, and the resource configuration information indicates at least two resource groups and resources included in each resource group.

An embodiment of the present disclosure also provides a network device, which includes:

a first receiving unit, configured to receive target channel state information (CSI) sent by the terminal device, where a target CSI includes first information, and the first information indicates at least one resource group and transmission mode of a transmission point recommended by a terminal;

the target CSI is determined by the terminal device according to resource configuration information for channel measurement and at least one CSI acquired by CSI reporting configuration, and the resource configuration information indicates at least two resource groups and resources included in each resource group.

An embodiment of the present disclosure also provides a processor-readable storage medium, where the processor-readable storage medium stores computer programs, and the computer programs are used to cause the processor to execute the above-mentioned method.

The beneficial effects of the present disclosure are as follows:

In the above-mentioned schemes, at least one CSI is acquired by performing channel measurement according to the resource configuration information and the reporting configuration, and a target CSI is selected from the CSI and reported to the network device, so as to indicate to the network device the combination of at least one resource or at least two resources recommended by the terminal and the type of transmission mode, because the resource group corresponds to the TRP. In this way, the corresponding relationship between the CSI and the TRP selected by the terminal can be reflected, thereby guaranteeing the reliability of network transmission.

BRIEF DESCRIPTION OF THE DRAWINGS

In order to more clearly explain the technical solutions in the embodiments of the present application or related technology, the drawings that need to be used in the description of the embodiments or related technology will be introduced briefly below, obviously, the drawings in the following description are only some embodiments described in the present application, for those ordinarily skilled in the art, other drawings can also be acquired on the basis of these drawings without any creative effort.

FIG. 3 shows a flowchart of an information reporting method applied to a terminal device according to an embodiment of the present disclosure FIG. 4 shows a flowchart of an information receiving method applied to a network device in the present disclosure;

DETAILED DESCRIPTION

The technical solutions in the embodiments of the present application will be described clearly and completely below with reference to the drawings in the embodiments of the present application, obviously, the described embodiments are part of the embodiments of the present application, rather than all of embodiments. Based on the embodiments in the present application, all other embodiments acquired by those ordinarily skilled in the art without making creative efforts fall within the protection scope of the present application.

The terms "first", "second" and the like in the specification and claims of the present application are used to distinguish similar objects, and are not necessarily used to describe a specific order or sequence. It should be understood that the data so used may be interchanged under appropriate circumstances such that the embodiments of the present application described herein are, for example, practiced in sequences other than those illustrated or described herein. Furthermore, the terms "including" and "having", as well as any variations thereof, are intended to cover a non-exclusive inclusion, for example, a process, method, system, product or device including a sequence of steps or elements is not necessarily limited to the expressly listed these steps or units, may include other steps or elements not explicitly listed or inherent to the process, method, product or device.

The term "and/or" in the embodiments of the present application describes the association relationship of associated objects, indicating that there may be three relationships, for example, A and/or B, which may mean these three cases: A exists alone, A and B exist simultaneously, and B exists alone. The character "/" generally indicates that the contextual objects are an "or" relationship. The term "plurality" in the embodiments of the present application refers to two or more, and other quantifiers are similar.

In the embodiments of the present application, words such as "exemplary" or "for example" are used as examples, illustrations or illustrations. Any embodiment or design solution described as "exemplary" or "for example" in the embodiments of the present application shall not be construed as being more optional or more advantageous than other embodiments or design solutions. Rather, the use of words such as "exemplary" or "such as" is intended to present related concepts in a concrete manner.

Embodiments of the present application will be described below in conjunction with the drawings. The mode indication method, terminal device, and network device provided in the embodiments of the present application may be applied in a radio communication system. The radio communication system may be a system adopting the fifth generation (5th Generation, 5G) mobile communication technology (hereinafter referred to as 5G system for short). Those skilled in the art can understand that the 5G NR system is only an example and not a limitation.

Figure 1:
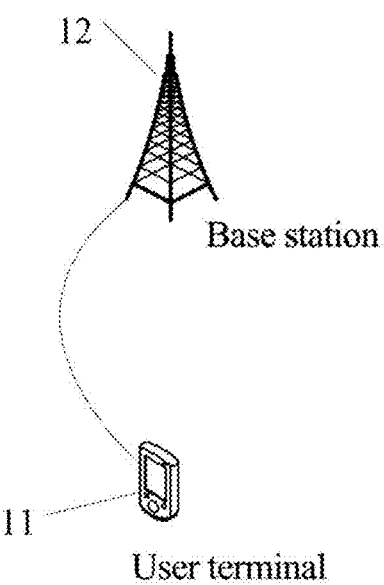
FIG. 1 shows a structural view of a network system applicable to an embodiment of the present disclosure.

Referring to FIG. 1, FIG. 1 is a structural view of a network system applicable to an embodiment of the present application. As shown in FIG. 1, it includes a user terminal 11 and a base station 12, where the user terminal 11 may be a user equipment (User Equipment, UE), for example: the user equipment may be a mobile phone, a tablet computer (Tablet Personal Computer), a laptop computer (Laptop Computer), a personal digital assistant (personal digital assistant, referred to as PDA), a mobile Internet device (Mobile Internet Device, MID) or a wearable device and other terminal side devices, it should be noted that the specific type of the user terminal 11 is not limited in the embodiments of the present application. The above-mentioned base station 12 may be a base station of 5G and later versions (for example: gNB, 5G NR NB), or a base station in other communication system, or called Node B, it should be noted that in the embodiments of the present application, only 5G base station is taken as an example, but the specific type of the base station 12 is not limited.

First, some concepts related to the embodiments of the present disclosure are described as follows.

1. Channel State Information (CSI)

CSI feedback determines the performance of multiple-input multiple-output (User Multiple-Input Multiple-Output, MIMO) transmission, so the CSI feedback plays a pivotal role in the entire MIMO design. In the Long Term Evolution (LTE) system, a variety of different feedback types are defined in different standardized versions (Rel-8-Rel-14) to support CSI channel information feedback of different MIMO transmission schemes. This design leads to the dispersion and complexity of different transmission schemes and information feedback. In order to avoid introducing multiple feedback types/sub-feedback types in the fifth generation (5 Generation, 5G) communication system, designing a unified CSI feedback framework is considered. The system design decouples CSI measurement and CSI feedback methods, separates measurement resources and measurement operations from specific reporting operations, and supports different MIMO transmission methods in multiple scenarios and multiple frequency bands application in a more flexible manner. In addition, for the emerging beam management requirements of the 5G system, the beam indication and the corresponding reference signal measurement power (Reference Signal Received Power, RSRP) and other information needs to be reported.

In the New Radio (NR) system, CSI may include Channel Quality Indicator (Channel Quality Indicator, CQI), Precoding Matrix Indicator (Precoding Matrix Indicator, PMI), Channel State Information Reference Signal (Channel State Information-Reference Signal, CSI-RS) Resource Indication (CRI), Synchronization Signal (Synchronization Signal, SS)/Physical Broadcast Channel (Physical Broadcast Channel, PBCH) Block Resource Indication (SSBRI), Layer Indication (LI), Rank Indication (Rank Indication, RI) and L1-RSRP, where SSBRI, LI and L1-RSRP are newly added feedback quantities based on the CSI feedback of the LTE system. LI is used to indicate the strongest column in the PMI for phase tracking reference signal (Phase tracking reference signal, PT-RS) mapping. SSBRI and L1-RSRP are used for beam management, one indicates beam index and the other indicates beam strength.

Figure 2:
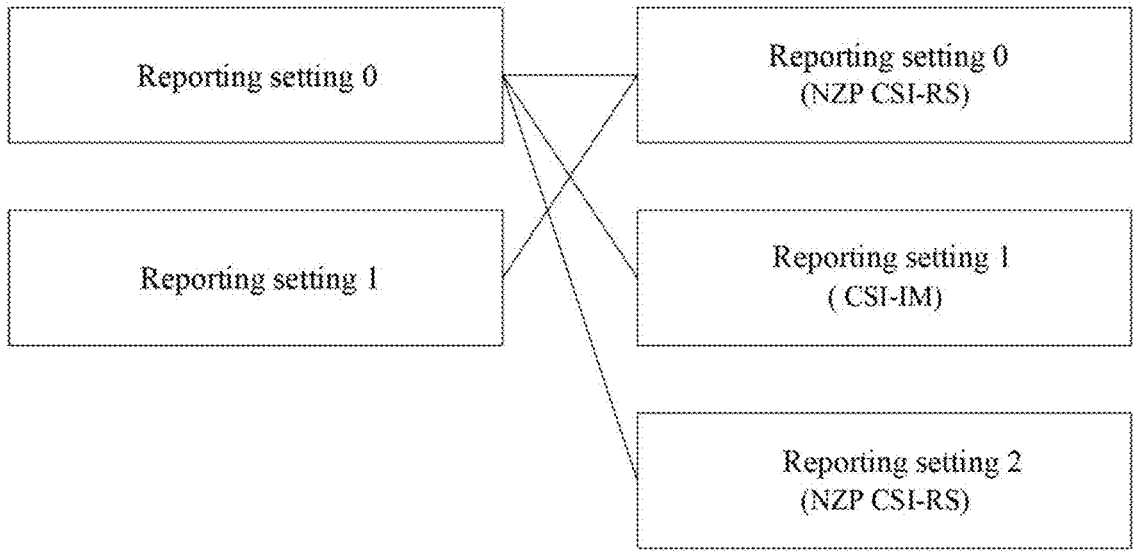
FIG. 2 shows a schematic view of an example of a CSI feedback framework.

According to the above-mentioned principle of decoupling CSI measurement and CSI feedback, the system will configure each user equipment (User Equipment, UE, also called terminal or terminal device) with N≥1 reporting feedback settings (Reporting Setting) for reporting different measurement results, and M≥1 CSI-RS measurement resource settings (Resource Setting). Each Reporting Setting is associated with one or more Resource Rettings for channel and interference measurement and reporting, so that different measurement sets and reporting combinations can be flexibly set according to different terminal requirements and application scenarios. As shown in FIG. 2, for a certain terminal, three measurement sets are set, which respectively correspond to different CSI-RS measurement resource combinations; simultaneously, the terminal is also configured with two types of reporting settings, and result of three measurement sets is reported for setting 0, while result of one measurement set is reported for setting $1_z$.

The above-mentioned process is designed for single transmission point (Transmission Reference Point, TRP) transmission, and cannot reflect the channel quality during M-TRP transmission. In response to this problem, the 3rd Generation Partnership Project (3rd Generation Partnership Project, 3GPP) sets up a topic on M-TRP CSI feedback enhancement in Rel-17. According to the conclusions of the current standardization discussion, in the CSI measurement process of M-TRP, several resources (resources) in one resource set (resource set) are used as channel measurement resources (Channel Measurement Resources, CMR) of each TRP participating in the cooperation. Based on the measurement of the above-mentioned resources, the terminal calculates and reports the corresponding CSI according to different transmission scheme assumptions.

During the above-mentioned process, issues that have not been clarified include:

a. How to map resources and TRPs during the CSI reporting configuration process. For example, the terminal should at least know which resources and which other resources do not belong to the same TRP;

b. In the CSI calculation and reporting by the terminal, how to reflect the corresponding relationship between CSI and the TRP and transmission scheme selected by the terminal; or in other words, how the terminal reports its recommended TRP and transmission scheme.

2. Quasi Co-Location (QCL)

Transport Configuration Indication (Transport Configuration Indication, TCI) state (state) indication and QCL: the TCI state of the CSI RS includes at most two QCL types, and each QCL type corresponds to one reference signal.

An embodiment of the present disclosure provides an information reporting and receiving method, a terminal device, and a network device to solve the problem in the related art that in the process of CSI calculation and reporting for multi-point coordinated transmission, the corresponding relationship between CSI and TRP selected by the terminal cannot be reflected, so that the reliability of network transmission cannot be guaranteed.

The method and the apparatus are conceived based on the same application. Since the principles of solving problems of the method and the apparatus are similar, the implementation of the apparatus and the method can be referred to each other, and the repetition will not be repeated.

As shown in FIG. 3, an embodiment of the present disclosure provides an information reporting method, performed by a terminal device, which includes:

Step S301, acquiring resource configuration information for channel measurement;

it should be noted that the resource configuration information indicates at least two resource groups and resources included in each resource group, it should also be noted that each resource group in the embodiment of the present disclosure corresponds to one transmission point (TRP), that is to say, there is a one-to-one correspondence between resource groups and TRPs in the embodiments of the present disclosure;

Step S302, determining reporting configuration of channel state information (CSI);

Step S303, acquiring at least one CSI according to the resource configuration information and the reporting configuration;

Step S304, sending a target CSI to a network device according to the at least one CSI, where the target CSI includes first information, and the first information indicates a target resource and a type of transmission mode recommended by a terminal, where the target resource includes: at least one resource (it should be noted that the at least one resource is a resource in at least one resource group, and the at least one resource corresponds to single-point transmission) or a combination of at least two resources (it should be noted that the at least two resources include at least one resource in two resource groups, that is, the combination of the at least two resources corresponds to multi-point transmission), it should be noted that the transmission mode mentioned here includes at least one of multi-point transmission and single-point transmission.

In the embodiment of the present disclosure, the first information indicates at least one resource or a combination of at least two resources recommended by the terminal and the type of transmission mode, which indirectly reflects the corresponding relationship between CSI and the TRP selected by the terminal, thereby ensuring the reliability of network transmission.

Specifically, it should be noted that the type of transmission mode of single-point transmission mentioned in the embodiments of the present disclosure includes at least one of the following:

S11. Dynamic Transmission Point Selection (DPS);

This case means that all DMRS ports correspond to one TCI state.

S12, DPS and Single-Point Repeat Transmission;

This case means that all DMRS ports correspond to one TCI state, and the PDSCH is repeatedly transmitted more than once.

S13. Dynamic Transmission Point Become Silence (DPB);

This case means that all DMRS ports correspond to one TCI state, and the PDSCH corresponding to at least one resource will not send any signal on the resource where the terminal device expects to receive the PDSCH.

S14, DPB and Single-Point Repeat Transmission;

This case means that all DMRS ports correspond to one TCI state, the PDSCH is repeatedly transmitted more than once, and the PDSCH corresponding to at least one resource will not send any signal on the resource where the terminal device expects to receive the PDSCH.

The type of transmission mode of multi-point transmission mentioned in the embodiments of the present disclosure includes at least one of the following:

S21. Space division multiplexing (SDM);

This case means that in a case that the DCI is not used to indicate the terminal device, the DCI field "Time Domain Resource Allocation" indicates the field containing repetitionNumber-r16 in PDSCH-TimeDomainResourceAllocation-r16, and the DCI field "Transport Configuration Indication" and Two TCI states in codepoints of DMRS ports within two CDM groups in DCI are used to indicate the field "antenna port".

S22. Frequency division multiplexing (FDM) Mode A;

This case refers to, for terminal device configured by the higher layer parameter RepetitionScheme-r16 set as "FDM mode A", and in a case that two TCI states in the codepoints of DMRS ports within one CDM group in the DCI field "Transport Configuration Indication" and DCI field "Antenna Port" are used to indicate the terminal device.

S23, FDM mode B;

This case refers to, for terminal device configured by the higher layer parameter RepetitionScheme-r16 set as "FDM mode B", and in a case that two TCI states in the codepoints of DMRS ports within one CDM group in the DCI field "Transport Configuration Indication" and DCI field "Antenna Port" are used to indicate the terminal device.

S24. Time division multiplexing (TDM) Mode A;

This case refers to a terminal device configured with TDM mode A and indicated by two TCI states in codepoints of DCI filed "Transport Configuration Indication" and DM-RS ports within one CDM group in the DCI field "antenna port".

S25, TDM method four;

This case means that in a case that a terminal device configured by the higher layer parameter PDSCH config indicating at least one field includes repetitionNumber-r16 in PDSCH-TimeDomainResourceAllocation-r16, if two TCI states are indicated by the DCI field "Transport Configuration Indication" and the DCI field "Time Domain Resource Allocation" together, where the DCI field "antenna port" includes the repetition number r16 in the PDSCH-TimeDomainResourceAllocation-r16 and the DMRS port in one CDM group.

S26, High-speed rail enhancement method;

This case means that on the same PDSCH resource, the same group of DMRS ports corresponds to at least two TCI states.

It should be further noted that, in at least one embodiment of the present disclosure, the specific implementation of step S301 is as follows;

receiving grouping configuration information sent by the network device, determining the resource configuration information for channel measurement according to the grouping configuration information.

It should be noted that the grouping configuration information refers to the configuration that the network device informs the terminal device of how to perform grouping, so that the terminal device can clarify how the network device side performs resource grouping. In at least one embodiment of the present disclosure, the resource set for channel measurement is divided into at least two groups.

It should be further noted that the grouping configuration information includes any of the following:

A11. group identification information corresponding to each resource in a resource set for channel measurement;

It should be noted that after the network device notifies the terminal of the group identification information corresponding to each resource, the terminal device can determine which group each resource belongs to according to the group identification information, in this case, the terminal acquires several group identification information, and then the resource set for channel measurement is divided into several groups, and simultaneously, the terminal can also determine how many resources are in each group.

A12. the size of each resource group;

It should be noted that, in this case, the network device notifies the terminal device of the size of each resource group, and the terminal determines the resources included in the resource group according to the size of the resource group. If the network device is configured with M resource groups, and the quantities of resources in the respective resource groups are $N_1, \ldots, N_M$, the terminal device determines that one group of resources numbered 1 to $N_1$ is the first group; one group of resources numbered $N_1+1$ to $N_1+N_2$ is the second group; by analogy, one group of resources numbered $N_1+N_2+ \ldots +N_{M-1}+1$ to $N_1+N_2+ \ldots +N_M$ is the $N_M$th group.

For example, the network device divides the resources in the resource group for channel measurement into two groups, and the terminal device finally determines that one group of resources numbered 1 to $N_1$ is the first group, and one group of resources numbered $N_1+1$ to $N_1+N_2$ is the second group.

A13. a bitmap (bitmap) corresponding to resources in the resource set for channel measurement;

It should be noted that in this method, the network device directly informs the terminal device of the grouping number of each resource in the form of a bitmap, and the terminal device determines how many groups the resource set for channel measurement is divided into according to the grouping number, and simultaneously, the terminal can also determine how many resources are in each group.

It is assumed that the resource numbers in the resource set for channel measurement are 1 to R, and a bitmap of length R is used to indicate the group to which each resource belongs, the value of the rth ($r=1, \ldots, R$) element of the bitmap is the resource grouping identification to which the rth resource belongs.

For example, in a case that the network device divides the resources in the resource group for channel measurement into two groups, the value of the first element of the bitmap is the resource grouping identification of the first resource (for example, the resource grouping identification is 1 or 2), the value of the second element of the bitmap is the resource grouping identification of the second resource (for example, the resource grouping identification is 1 or 2), and so on.

A14. quasi-co-location (QCL) relationship of resources in the resource set for channel measurement.

It should be noted that, in this case, the determining the resource configuration information for channel measurement according to the grouping configuration information includes:

determining, for a first resource and a second resource in the resource set for channel measurement, that the first resource and the second resource belong to the same resource group in a case that the first resource and the second resource have a first type of QCL relationship with a first reference signal;

where the first type includes one of the following:

Type A;

Type B;

Type C;

Type D;

Type A and Type D; or,

Type C and Type D.

That is to say, this case means that if any two resources in the resource set for channel measurement have the first type of QCL relationship with the same reference signal (in other words, the reference signals corresponding to the first type in the TCI states of the two resources are the same), then the two resources are in the same group.

It should be further noted that the grouping configuration information further includes: identification information indicating resources in a first resource group of the at least two resource groups to acquire CSI in a transmission mode of single-point transmission.

That is to say, the grouping configuration information can also indicate that the resources included in several resource groups can only acquire CSI in a transmission mode of single-point transmission.

It should be further noted that configuration mode of the reporting configuration includes at least one of the following:

B11. network device configuration;

B12. predefinition; or,

B13. terminal reporting configuration;

It should be noted that, this case refers to that the terminal device recommends a reporting configuration set that can be used during reporting, and the network device selects a reporting configuration from the reporting configuration set recommended by the terminal for notifying to the terminal device.

B14. Determination According to Resource Configuration Information.

It should be noted that this case refers to: if the configuration of the network device is selected, all the resources in the resource set can only use the transmission mode of single-point transmission to acquire CSIs, and then the terminal can only report several CSIs acquired on the basis of the transmission mode of single-point transmission.

Further, the reporting configuration includes at least one of the following:

C11. reporting at least one CSI acquired on the basis of a transmission mode of single-point transmission; or, C12. reporting at least one CSI acquired on the basis of a transmission mode of multi-point transmission.

It should be further noted that, in a case that the reporting configuration includes: reporting at least one CSI acquired on the basis of the transmission mode of multi-point transmission, the acquiring at least one CSI according to the resource configuration information and the reporting configuration includes:

selecting at least two groups from the at least two resource groups, and selecting one resource from each group of the at least two groups to perform channel measurement respectively, and acquiring corresponding CSI.

That is to say, in this case, the terminal device needs to select at least two groups from M (M is greater than or equal to 2) resource groups, and select one resource from the at least two groups to perform the channel measurement respectively; then the terminal assumes that the data is transmitted through the channels corresponding to the above-mentioned multiple resources in a certain type of multi-point transmission mode; the terminal device calculates the corresponding CSI based on the above-mentioned assumption.

It should be further noted that, in a case that the reporting configuration includes: reporting at least one CSI acquired on the basis of the transmission mode of single-point transmission, the acquiring at least one CSI according to the resource configuration information and the reporting configuration includes:

selecting a second resource from a first resource to perform channel measurement, and acquiring corresponding CSI, where the first resource is all resources that can be used for CSIs acquired on the basis of the transmission mode of single-point transmission, or the first resource is all resources configured by the network device.

It should be noted that the resources that can be used for the CSIs acquired on the basis of the transmission mode of single-point transmission are configured by the network device, in a case that the network device has no additional configuration, the first resource is all resources configured by the network device.

That is to say, in this case, the terminal device needs to select one resource from the first resource, and use this resource to perform channel measurement; then the terminal device assumes that data is transmitted through the channel corresponding to the above-mentioned resource in a certain type of single-point transmission mode; the terminal device calculates the corresponding CSI based on the above-mentioned assumption.

It should be noted that, in all resource groups configured by the network device, there may be only resources based on the transmission mode of single-point transmission, or only resources based on the transmission mode of multi-point transmission, or there may be resources based on the transmission mode of single-point transmission and resources based on the transmission mode of multi-point transmission at the same time, for the resources of different transmission modes, the reporting configurations that the terminal device can adopt are different, and the quantities of the first information in the corresponding target CSI are also different, the different cases are described below respectively.

In case 1, there are only resources based on the transmission mode of single-point transmission, at this time, the corresponding reporting configuration only includes: reporting at least one CSI acquired on the basis of the transmission mode of single-point transmission.

1. In a case that the target CSI includes $X_1$ first information, each of the first information satisfies one of the following items of:

D11. being configured to identify one of combinations of $Y_1$ resources and $Z_1$ types of transmission modes of single-point transmission.

Specifically, the total number of bits occupied by the first information in the target CSI is: $X_1 \times \lceil \log_2 Y_1 Z_1 \rceil$.

It should be noted that $X_1$ is a quantity of CSIs acquired on the basis of the transmission mode of single-point transmission; $Y_1$ is a quantity of resources that can be used for CSIs acquired on the basis of the transmission mode of single-point transmission; $Z_1$ is a quantity of types of the transmission modes of single-point transmission; $X_1, Y_1$ and $Z_1$ are all positive integers.

For example, in a case that the first information is Channel State Information Reference Signal Resource Indication (CRI), if the quantity of CSIs acquired on the basis of the transmission mode of single-point transmission is $X_1=1$, the quantity of types of the transmission modes of single-point transmission is $Z_1=1$ (for example, DPS, DPB, DPS and single-point repeat transmission or DPS and single-point repeat transmission), then the target CSI reported by the terminal device includes one CRI, and the CRI is configured to identify one of the $Y_1$ resources (it should be noted that each CRI corresponds to one of the resources), and the total number of bits of CRI required at this time is $\lceil \log_2 Y_1 \rceil$.

For example, in a case that the first information is CRI, if the quantity of CSIs acquired on the basis of the transmission mode of single-point transmission is $X_1=2$, the quantity of types of the transmission modes of single-point transmission is $Z_1=1$ (for example, DPS, DPB, DPS and single-point repeat transmission or DPS and single-point repeat transmission), the target CSI reported by the terminal device includes 2 CRIs, and each CRI is configured to identify one of the $Y_1$ resources (each CRI corresponds to one of the resources), and the total number of bits of CRI required at this time is $2 \times \lceil \log_2 Y_1 \rceil$.

D12. each of the first information corresponds to one resource in one resource group.

Specifically, the total number of bits occupied by the first information in the target CSI is: a sum of number of bits occupied by each resource group; further, the number of bits occupied by each resource group is $\lceil \log_2 N_x \rceil$, and $N_x$ is a quantity of resources in the $x_{th}$ resource group.

For example, in a case that the first information is CRI, if the quantity of CSIs acquired on the basis of the transmission mode of single-point transmission is $X_1=2$, the quantity of types of the transmission modes of single-point transmission is $Z_1=1$ (for example, DPS, DPB, DPS and single-point repeat transmission or DPS and single-point repeat transmission), the target CSI reported by the terminal device includes 2 CRIs, the first CRI is configured to identify one of the $N_1$ resources of the first resource group, the second CRI is configured to identify one of the $N_2$ resources of the second resource group, and the total number of bits of CRI required at this time is $\lceil \log_2 N_1 \rceil + \lceil \log_2 N_2 \rceil$.

2. In a case that the target CSI includes one first information, each of the first information satisfies one of the following items of:

D21. being configured to identify $X_1$ combinations selected from combinations of $Y_1$ resources and $Z_1$ types of transmission modes of single-point transmission;

specifically, the total number of bits occupied by the first information in the target CSI is:

$$\lceil \log_2 C_{Y_1 Z_1}^{X_1} \rceil,$$

where $$C_{Y_1 Z_1}^{X_1}$$

is a quantity of combinations of $X_1$ elements selected from $Y_1 Z_1$ elements.

It should be noted that $X_1$ is a quantity of CSIs acquired on the basis of the transmission mode of single-point transmission; $Y_1$ is a quantity of resources that can be used for CSIs acquired on the basis of the transmission mode of single-point transmission; $Z_1$ is a quantity of types of the transmission modes of single-point transmission; $X_1$, $Y_1$ and $Z_1$ are all positive integers.

For example, in a case that the first information is CRI, if the quantity of CSIs acquired on the basis of the transmission mode of single-point transmission is $X_1=2$, and the quantity of types of the transmission modes of single-point transmission is $Z_1=1$, then the target CSI reported by the terminal device includes one CRI, and the CRI is configured to identify two combinations selected from the $Y_1$ resources, and the total number of bits of CRI required at this time is $$\lceil \log_2 C_{Y_1}^2 \rceil.$$

D22. being configured to identify one combination of resources selected from multiple resource groups;

specifically, the total number of bits occupied by the first information in the target CSI is: $\lceil \log_2 N_1 \times \ldots \times N_X \rceil$, where $N_1$ is a quantity of resources in a first resource group, and $N_x$ is a quantity of resources in the $x_{th}$ resource group.

For example, in a case that the first information is CRI, if the quantity of CSIs acquired on the basis of the transmission mode of single-point transmission is $X_1=2$, and the quantity of types of the transmission modes of single-point transmission is $Z_1=1$, then the target CSI reported by the terminal device includes one CRI, and the CRI is configured to identify a combination formed by selecting one of the $N_1$ resources of the first group of resources and simultaneously selecting one of the $N_2$ resources of the second group of resources, and the total number of bits of CRI required at this time is $\lceil \log_2 N_1 N_2 \rceil$.

In case 2, there are only resources based on the transmission mode of multi-point transmission, and the corresponding reporting configuration at this time only includes: reporting at least one CSI acquired on the basis of the transmission mode of multi-point transmission.

1. In a case that the target CSI includes $X_2$ first information, each of the first information is configured to identify one of combinations of $Y_2$ resource combinations and $Z_2$ types of transmission modes of multi-point transmission.

Specifically, the total number of bits occupied by the first information in the target CSI is: $X_2 \times \lceil \log_2 Y_2 Z_2 \rceil$.

It should be noted that $X_2$ is a quantity of CSIs acquired on the basis of the transmission mode of multi-point transmission; $Y_2$ is a quantity of resource combinations (it should be noted that the resource combination method can be configured by the network device, or can be agreed upon by the terminal device) that can be used for CSIs acquired on the basis of the transmission mode of multi-point transmission; $Z_2$ is a quantity of types of the transmission modes of multi-point transmission; $X_2$, $Y_2$ and $Z_2$ are all positive integers.

For example, in a case that the first information is CRI, if the quantity of CSIs acquired on the basis of the transmission mode of single-point transmission is $X_1=1$, and the quantity of types of the transmission modes of single-point transmission is $Z_1=1$, then the target CSI reported by the terminal device includes one CRI, and the CRI is configured to identify one of $Y_2$ resource combinations, and the total number of bits of CRI required at this time is: $\lceil \log_2 Y_2 \rceil$.

For example, there are 4 resources in the first resource group, and there are 4 resources in the second resource group, among the combinations composed of one resource from each of the two resource groups determined through the CSI reporting configuration, there are 8 combinations that can be used for multi-point transmission assumptions, and 3-bit CRI can be used for indication.

2. In a case that the target CSI includes one first information, each of the first information is configured to identify $X_2$ combinations selected from the combinations of $Y_2$ resource combinations and $Z_2$ types of the transmission modes of multi-point transmission.

Specifically, the total number of bits occupied by the first information in the target CSI is:

$$\lceil \log_2 C_{Y_2 Z_2}^{X_2} \rceil;$$

where $$C_{Y_2 Z_2}^{X_2}$$

is a quantity of combinations of $X_2$ elements selected from $Y_2 Z_2$ elements.

It should be noted that $X_2$ is a quantity of CSIs acquired on the basis of the transmission mode of multi-point transmission; $Y_2$ is a quantity of resource combinations that can be used for CSIs acquired on the basis of the transmission mode of multi-point transmission; $Z_2$ is a quantity of types of the transmission modes of multi-point transmission; $X_2$, $Y_2$ and $Z_2$ are all positive integers.

In case 3: there are resources based on the transmission mode of multi-point transmission and resources based on the transmission mode of single-point transmission simultaneously, at this time, the corresponding reporting configuration only includes: reporting at least one CSI acquired on the basis of the transmission mode of multi-point transmission or reporting at least one CSI acquired on the basis of the transmission mode of single-point transmission.

It should be noted that in this case, in a case that the reporting configuration of the terminal device is the reporting at least one CSI acquired on the basis of the transmission mode of single-point transmission, the specific implementation method refers to case 1; in a case that the reporting configuration of the terminal device is the reporting at least one CSI acquired on the basis of the transmission mode of multi-point transmission, the specific implementation method refers to case 2, which will not be repeated here.

In case 4: there are resources based on the transmission mode of multi-point transmission and resources based on the transmission mode of single-point transmission simultaneously, at this time, the corresponding reporting configuration only includes: reporting at least one CSI acquired on the basis of the transmission mode of multi-point transmission and reporting at least one CSI acquired on the basis of the transmission mode of single-point transmission.

1. The target CSI includes $X_1 + X_2$ first information; specifically, each first information of the $X_1$ first information is configured to identify one of the combinations of $Y_1$ resources and $Z_1$ types of transmission modes of single-point transmission, each first information of the $X_2$ first information is configured to identify one of the combinations of $Y_2$ resources and $Z_2$ types of transmission modes of multi-point transmission.

Further, the number of bits occupied by the first information in the target CSI is: $X_1 \times \log_2 Y_1 Z_1 + X_2 \times \lceil \log_2 Y_2 Z_2 \rceil$.

It should be noted that each first information of $X_1$ first information is configured to identify one of the combinations of $Y_1$ resources and $Z_1$ types of transmission modes of single-point transmission, and each first information of $X_2$ first information is configured to identify one of the combinations of $Y_2$ resources and $Z_2$ types of transmission modes of multi-point transmission; where $X_1$ is a quantity of CSIs acquired on the basis of the transmission mode of single-point transmission; $Y_1$ is a quantity of resources that can be used for CSIs acquired on the basis of the transmission mode of single-point transmission; $Z_1$ is a quantity of types of the transmission modes of single-point transmission; $X_2$ is a quantity of CSIs acquired on the basis of the transmission mode of multi-point transmission; $Y_2$ is a quantity of resource combinations that can be used for CSIs acquired on the basis of the transmission mode of multi-point transmission; $Z_2$ is a quantity of types of the transmission modes of multi-point transmission; $X_1$, $Y_1$, $Z_1$, $X_2$, $Y_2$ and $Z_2$ are all positive integers.

For example, in a case that the first information is CRI, if the quantity of CSIs acquired on the basis of the transmission mode of single-point transmission is $X_1=2$, the quantity of types of the transmission modes of single-point transmission is $Z_1=1$, and at the same time, the quantity of CSIs acquired on the basis of the transmission mode of single-point transmission is $X_2=1$, and the quantity of types of transmission modes of single-point transmission is $Z_2=1$. For single-point transmission, 2 CRIs are reported, each CRI is configured to identify one of the $Y_1$ resources, and the total number of bits of CRI required at this time is $2 \times \lceil \log_2 Y_1 \rceil$; $X_2=1$ CRIs for multi-point transmission assumptions also need to be reported at the same time, and the CRI is configured to identify one of the $Y_2$ resource combinations, the total number of bits of CRI required at this time is $\lceil \log_2 Y_2 \rceil$; in this way, the terminal reports a total of 3 CRIs, and the total number of bits is $2 \times \lceil \log_2 Y_1 \rceil + \lceil \log_2 Y_2 \rceil$ in total; or if the first CRI of the two reported CRIs is configured to identify one of the $N_1$ resources of the first resource group for single-point transmission assumption, the second CRI is configured to identify one of the $N_2$ resources of the second resource group. The total number of bits of the two CRIs for single-point transmission assumption required at this time is $\lceil \log_2 N_1 + \lceil \log_2 N_2 \rceil$, and then 1 CRI for the multi-point transmission assumption is added, the total number of bits of CRI required is $\lceil \log_2 N_1 + \log_2 N_2 \rceil + \log_2 Y_2 \rceil$.

2. The target CSI includes a first information, and the first information is configured to identify $X_1$ combinations selected from the combinations of $Y_1$ resources and $Z_1$ types of transmission modes of single-point transmission, and $X_2$ combinations selected from the combinations of $Y_2$ resource combinations and $Z_2$ types of transmission modes of multi-point transmission.

Specifically, the number of bits occupied by the first information in the target CSI is:

$$\lceil \log_2 (C_{Y_1 Z_1}^{X_1} C_{Y_2 Z_2}^{X_2}) \rceil,$$

where $$C_{Y_1 Z_1}^{X_1}$$

is a quantity of combinations of $X_1$ elements selected from $Y_1 Z_1$ elements; and $$C_{Y_2 Z_2}^{X_2}$$

is a quantity of combinations of $X_2$ elements selected from $Y_2 Z_2$ elements.

It should be noted that $X_1$ is a quantity of CSIs acquired on the basis of the transmission mode of single-point transmission; $Y_1$ is a quantity of resources that can be used for CSIs acquired on the basis of the transmission mode of single-point transmission; $Z_1$ is a quantity of types of the transmission modes of single-point transmission; $X_2$ is a quantity of CSIs acquired on the basis of the transmission mode of multi-point transmission; $Y_2$ is a quantity of resource combinations that can be used for CSIs acquired on the basis of the transmission mode of multi-point transmission; $Z_2$ is a quantity of types of the transmission modes of multi-point transmission; $X_1$, $Y_1$, $Z_1$, $X_2$, $Y_2$ and $Z_2$ are all positive integers.

For example, in a case that the first information is CRI, if the quantity of CSIs acquired on the basis of the transmission mode of single-point transmission is $X_1=2$, the quantity of types of transmission modes of single-point transmission is $Z_1=1$, and at the same time, the quantity of CSIs acquired on the basis of the transmission modes of multi-point transmission is $X_2=1$, the quantity of types of transmission modes of multi-point transmission is $Z_2=1$, and one CRI is reported, and the CRI is configured to identify 2 selected from $Y_1$ resources, and 1 selected from $Y_2$ resources at the same time. The total number of bits of CRI required at this time is $$\lceil \log_2 (C_{Y_1}^2 C_{Y_2}^1) \rceil;$$

or it is also possible to use a CRI identifier to select one from the first group of $N_1$ resources for single-point transmission assumptions, and select one from the second group of $N_2$ resources for single-point transmission assumptions, and then select one from $Y_2$ resource combinations for multi-point transmission assumptions, and the total number of bits of CRI required at this time is $$\lceil \log_2 N_1 N_2 C_{Y_2}^1 \rceil.$$

It should be noted that, the above-mentioned examples in the embodiments of the present disclosure are all based on dividing a resource set into two resource groups as an example.

Optionally, the target CSI in the embodiment of the present disclosure may further include: at least one of CQI, PMI, RI and LI.

It should be noted that, in the embodiment of the present disclosure, at least one CSI is acquired by performing channel measurement according to the resource configuration information and the reporting configuration, and a target CSI is selected from the CSIs and reported to the network device, so as to indicate to the network device the combination of at least one resource or at least two resources recommended by the terminal and the type of transmission mode, because the resource group corresponds to the TRP. In this way, the corresponding relationship between the CSI and the TRP selected by the terminal can be reflected, thereby guaranteeing the reliability of network transmission.

The technical solutions provided by the embodiments of the present application may be applied to various systems, especially 5G systems. For example, the applicable system may be global system of mobile communication (global system of mobile communication, GSM) system, code division multiple access (code division multiple access, CDMA) system, wideband code division multiple access (Wideband Code Division Multiple Access, WCDMA) general packet radio service (general packet radio service, GPRS) system, long term evolution (long term evolution, LTE) system, LTE frequency division duplex (frequency division duplex, FDD) system, LTE time division duplex (time division duplex, TDD) system, long term evolution advanced (long term evolution advanced, LTE-A) system, universal mobile telecommunications system (universal mobile telecommunications system, UMTS), worldwide interoperability for microwave access (worldwide interoperability for microwave access, WiMAX) system, 5G new radio (New Radio, NR) system, etc. These various systems include terminal devices and network devices. The system may also include a core network part, such as an evolved packet system (Evolved Packet System, EPS), a 5G system (5GS), and the like.

The terminal device involved in this embodiment of the present application may be a device that provides voice and/or data connectivity to a user, a handheld device with a radio connection function, or other processing devices connected to a wireless modem. In different systems, the name of the terminal device may be different. For example, in a 5G system, the terminal device may be called user equipment (User Equipment, UE). Radio terminal device can communicate with one or more core networks (Core Network, CN) via a radio access network (Radio Access Network, RAN). The radio terminal device may be a mobile terminal device, such as a mobile phone (or called a "cellular" telephones) and computers with mobile terminal device, such as portable, pocket, hand-held, computer built-in or vehicle-mounted mobile apparatuses, which exchange language and/or data with the radio access network. For example, personal communication service (Personal Communication Service, PCS) phones, cordless phones, session initiated protocol (Session Initiated Protocol, SIP) phones, wireless local loop (Wireless Local Loop, WLL) stations, Personal Digital Assistant (personal digital assistant, PDA) and other devices. The radio terminal device can also be called a system, a subscriber unit (subscriber unit), a subscriber station (subscriber station), a mobile station (mobile station), a mobile (mobile), a remote station (remote station), an access point (access point), a remote terminal (remote terminal), an access terminal device (access terminal), a user terminal device (user terminal), a user agent (user agent), and a user device (user device), which are not limited in this embodiment of the present application.

The network device involved in this embodiment of the present application may be a base station, and the base station may include multiple cells that provide services for terminals. Depending on the different specific application scenario, the base station can also be called an access point, or can be a device in the access network that communicates with the radio terminal device through one or more sectors on the air interface, or other names. Network devices can be used to interchange received over-the-air frames with Internet Protocol (IP) packets and act as routers between radio terminal devices and the rest part of the access network, the rest part of the access network can include the Internet Protocol (IP) communication network. The network device may also coordinate attribute management for the air interface. For example, the network device involved in this embodiment of the present application may be a network device (Base Transceiver Station, BTS) in Global System for Mobile communications (Global System for Mobile communications, GSM) or Code Division Multiple Access (Code Division Multiple Access, CDMA), or may be a network device (NodeB) in wide-band code division multiple access (Wide-band Code Division Multiple Access, WCDMA), or an evolved network device (evolutional Node B, eNB or e-NodeB) in a long term evolution (long term evolution, LTE) system, a 5G base station (gNB) in a 5G network architecture (next generation system), or a home evolved base station (Home evolved Node B, HeNB), relay node (relay node), home base station (femto), pico base station (pico), etc, which are not limited in this embodiment of the present application. In some network structures, a network device may include a centralized unit (centralized unit, CU) node and a distributed unit (distributed unit, DU) node, and the centralized unit and the distributed unit may also be arranged geographically separately.

One or more antennas can be used between network devices and terminal devices for Multi Input Multi Output (Multi Input Multi Output, MIMO) transmission, and MIMO transmission may be Single User MIMO (Single User MIMO, SU-MIMO) or Multiple User MIMO (Multiple User MIMO, MU-MIMO). According to the shape and quantity of root antenna combinations, MIMO transmission may be 2D-MIMO, 3D-MIMO, FD-MIMO, or massive-MIMO, or diversity transmission, precoding transmission, or beamforming transmission, etc.

As shown in FIG. 4, an embodiment of the present disclosure provides an information receiving method, performed by a network device, which includes:

step S401, receiving target channel state information (CSI) sent by the terminal device, where a target CSI includes first information, and the first information indicates a target resource and a type of transmission mode recommended by the terminal;

where the target resource includes: at least one resource or a combination of at least two resources;

the target CSI is determined by the terminal device according to resource configuration information for channel measurement and at least one CSI acquired by CSI reporting configuration, and the resource configuration information indicates at least two resource groups and resources included in each resource group.

Optionally, prior to the receiving the target channel state information (CSI) sent by the terminal device, further including:

sending grouping configuration information to the terminal device, where the grouping configuration information is configured to determine the resource configuration information by the terminal device.

Optionally, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Optionally, the grouping configuration information further includes: identification information indicating resources in a first resource group of the at least two resource groups to acquire CSI in a transmission mode of single-point transmission.

It should be noted that all the descriptions about the network device in the above-mentioned embodiments are applicable to the embodiment of the information receiving method, and the same technical effect can also be achieved.

Figure 5:
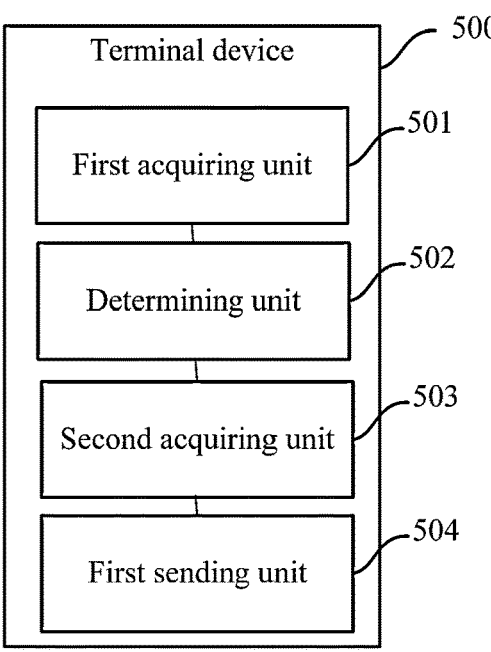
FIG. 5 shows a schematic view of units of a terminal device according to an embodiment of the present disclosure.

As shown in FIG. 5, an embodiment of the present disclosure provides a terminal device 50, which includes:

a first acquiring unit 51, configured to acquire resource configuration information for channel measurement, where the resource configuration information indicates at least two resource groups and resources comprised in each resource group;

a determining unit 52, configured to determine reporting configuration of channel state information (CSI);

a second acquiring unit 53, configured to acquire at least one CSI according to the resource configuration information and the reporting configuration;

a first sending unit 54, configured to send, according to the at least one CSI, a target CSI to a network device, where the target CSI includes first information, and the first information indicates a target resource and a type of transmission mode recommended by a terminal, where the target resource includes: at least one resource or a combination of at least two resources.

Optionally, the first acquiring unit 51 is specifically configured to:

receive grouping configuration information sent by the network device;

determine, according to the grouping configuration information, the resource configuration information for channel measurement.

Optionally, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Optionally, in a case that the grouping configuration information includes the QCL relationship of resources in the resource set for channel measurement, the determining the resource configuration information for channel measurement according to the grouping configuration information, specially includes:

determining, for a first resource and a second resource in the resource set for channel measurement, that the first resource and the second resource belong to a same resource group in a case that the first resource and the second resource have a first type of QCL relationship with a first reference signal;

where the first type includes one of the following:

Type A;

Type B;

Type C;

Type D;

Type A and Type D; or,

Type C and Type D.

Optionally, the grouping configuration information further includes: identification information indicating resources in a first resource group of the at least two resource groups to acquire CSI in a transmission mode of single-point transmission.

Optionally, configuration mode of the reporting configuration includes at least one of the following:

network device configuration;

predefinition;

terminal reporting configuration; or, determination according to resource configuration information.

Optionally, the reporting configuration includes at least one of the following:

reporting at least one CSI acquired on the basis of a transmission mode of single-point transmission; or, reporting at least one CSI acquired on the basis of a transmission mode of multi-point transmission.

Further, a type of the transmission mode of multi-point transmission includes at least one of the following:

space division multiplexing (SDM);

frequency division multiplexing (FDM) mode A;

FDM mode B;

time division multiplexing TDM mode A;

TDM mode four; or, high-speed rail enhancement mode.

Further, a type of the transmission mode of single-point transmission includes at least one of the following:

dynamic transmission point selection (DPS);

DPS and single-point repeat transmission;

dynamic transmission point become silent (DPB); or,

DPB and single-point repeat transmission.

Optionally, in a case that the reporting configuration includes: reporting at least one CSI acquired on the basis of the transmission mode of multi-point transmission, the second acquiring unit 53 is specially configured to:

select at least two groups from the at least two resource groups, and select one resource from each group of the at least two groups to perform channel measurement respectively, and acquire corresponding CSI.

Optionally, in a case that the reporting configuration includes: reporting at least one CSI acquired on the basis of the transmission mode of single-point transmission, the second acquiring unit 53 is specially configured to:

select a second resource from a first resource to perform channel measurement, and acquire corresponding CSI, where the first resource is all resources that can be used for CSIs acquired on the basis of the transmission mode of single-point transmission, or the first resource is all resources configured by the network device.

Optionally, in a case that the reporting configuration includes: reporting at least one CSI acquired on the basis of the transmission mode of single-point transmission, the target CSI includes $X_1$ first information, each of the first information is configured to identify one of combinations of $Y_1$ resources and $Z_1$ types of transmission modes of single-point transmission, or, each of the first information corresponds to one resource in one resource group;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

Further, in a case that each of the first information is configured to identify one of combinations of $Y_1$ resources and $Z_1$ types of transmission modes of single-point transmission, the total number of bits occupied by the first information in the target CSI is: $X_1 \times \lceil \log_2 Y_1 Z_1 \rceil$.

Optionally, in a case that each of the first information corresponds to one resource in one resource group, the total number of bits occupied by the first information in the target CSI is: a sum of number of bits occupied by each resource group.

Further, the number of bits occupied by each resource group is $\lceil \log_2 N_x \rceil$, and $N_x$ is a quantity of resources in the $x_{th}$ resource group.

Optionally, in a case that the reporting configuration includes: reporting at least one CSI acquired on the basis of the transmission mode of single-point transmission, the target CSI includes one first information, the first information is configured to identify $X_1$ combinations selected from combinations of $Y_1$ resources and $Z_1$ types of transmission modes of single-point transmission, or, the first information is configured to identify a combination of one resource selected from a plurality of resource groups respectively, where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

Further, in a case that the first information is configured to identify $X_1$ combinations selected from combinations of $Y_1$ resources and $Z_1$ types of transmission modes of single-point transmission, total number of bits occupied by the first information in the target CSI is:

$$\lceil \log_2 C_{Y_1 Z_1}^{X_1} \rceil,$$

where $$C_{Y_1 Z_1}^{X_1}$$

is a quantity of combinations of $X_1$ elements selected from $Y_1 Z_1$ elements.

Optionally, in a case that the first information is configured to identify the combination of one resource selected from the plurality of resource groups respectively, total number of bits occupied by the first information in the target CSI is: $\lceil \log_2 N_1 \times \ldots \times N_x \rceil$, where $N_1$ is a quantity of resources in a first resource group, and $N_x$ is a quantity of resources in the $x_{th}$ resource group.

Further, the reporting configuration includes: reporting at least one CSI acquired on the basis of the transmission mode of multi-point transmission, the target CSI includes $X_2$ first information, each of the first information is configured to identify one of combinations of $Y_2$ resource combinations and $Z_2$ types of transmission modes of multi-point transmission;

where $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

Further, total number of bits occupied by the first information in the target CSI is: $X_2 \times \lceil \log_2 Y_2 Z_2 \rceil$.

Optionally, the reporting configuration includes: reporting at least one CSI acquired on the basis of the transmission mode of multi-point transmission, the target CSI includes one first information, the first information is configured to identify $X_2$ combinations selected from the combinations of $Y_2$ resource combinations and $Z_2$ types of transmission modes of multi-point transmission;

where $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

Further, total number of bits occupied by the first information in the target CSI is:

$$\lceil \log_2 C_{Y_2 Z_2}^{X_2} \rceil,$$

where $$C_{Y_2 Z_2}^{X_2}$$

is a quantity of combinations of $X_2$ elements selected from $Y_2 Z_2$ elements.

Optionally, the reporting configuration includes: reporting at least one CSI acquired on the basis of the transmission mode of single-point transmission and reporting at least one CSI acquired on the basis of the transmission mode of multi-point transmission, the target CSI includes $X_1 + X_2$ first information, where each first information of $X_1$ first information is configured to identify one of the combinations of $Y_1$ resources and $Z_1$ types of transmission modes of single-point transmission, and each first information of $X_2$ first information is configured to identify one of the combinations of $Y_2$ resources and $Z_2$ types of transmission modes of multi-point transmission;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_1$, $Y_1$, $Z_1$, $X_2$, $Y_2$ and $Z_2$ are all positive integers.

Further, number of bits occupied by the first information in the target CSI is: $X_1 \times \lceil \log_2 Y_1 Z_1 \rceil + X_2 \times \lceil \log_2 Y_2 Z_2 \rceil$.

Optionally, In a case that the reporting configuration includes: reporting at least one CSI acquired on the basis of the transmission mode of single-point transmission and reporting at least one CSI acquired on the basis of the transmission mode of multi-point transmission, the target CSI includes one first information; the first information is configured to identify $X_1$ combinations selected from the combinations of $Y_1$ resources and $Z_1$ types of transmission modes of single-point transmission, and $X_2$ combinations selected from the combinations of $Y_2$ resource combinations and $Z_2$ types of transmission modes of multi-point transmission;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_1$, $Y_1$, $Z_1$, $X_2$, $Y_2$ and $Z_2$ are all positive integers.

Further, the number of bits occupied by the first information in the target CSI is:

$$\lceil \log_2(C_{Y_1 Z_1}^{X_1} C_{Y_2 Z_2}^{X_2}) \rceil,$$

where $$C_{Y_1 Z_1}^{X_1}$$

is a quantity of combinations of $X_1$ elements selected from $Y_1 Z_1$ elements; and $$C_{Y_2 Z_2}^{X_2}$$

is a quantity of combinations of $X_2$ elements selected from $Y_2 Z_2$ elements.

Specially, the first information is a channel state information reference signal resource indicator (CRI).

It should be noted that this terminal device embodiment is a terminal device that corresponds one-to-one to the above method embodiments, and all the implementation methods in the above-mentioned method embodiments are applicable to this terminal device embodiment, and can also achieve the same technical effect.

It should be noted that the division of units in the embodiment of the present application is schematic, and is only a logical function division, and there may be another division manner in actual implementation. In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is realized in the form of a software function unit and sold or used as an independent product, the integrated unit can be stored in a processor-readable storage medium. Based on this understanding, the essence of the technical solution of the present application or the part that contributes to the related technology or all or part of the technical solution can be embodied in the form of a software product, and the computer software product is stored in a storage medium. Several instructions are included to cause a computer device (which may be a personal computer, a server, or a network device, etc.) or a processor (processor) to execute all or part of the steps of the methods described in the various embodiments of the present application. The aforementioned storage media include: U disk, mobile hard disk, read-only memory (Read-Only Memory, ROM), random access memory (Random Access Memory, RAM), magnetic disk or optical disk and other media that can store program codes.

Figure 6:
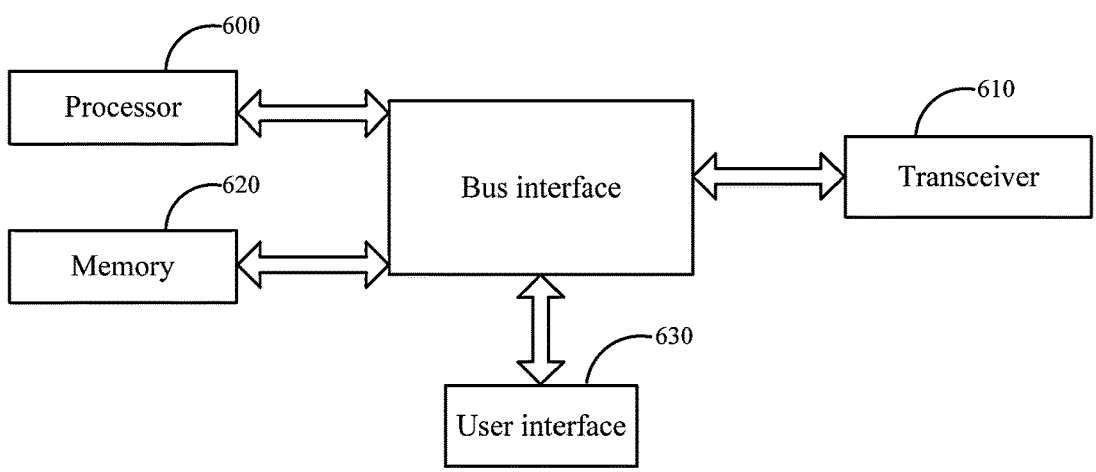
FIG. 6 shows a structural view of the terminal device according to an embodiment of the present application.

As shown in FIG. 6, an embodiment of the present disclosure also provides a terminal device, which includes a processor 600, a transceiver 610, a memory 620, and a program stored in the memory 620 and operable on the processor 600, where the transceiver 610 is connected to the processor 600 and the memory 620 through the bus interface, where the processor 600 is used to read the program in the memory and execute the following process of:

acquiring resource configuration information for channel measurement, where the resource configuration information indicates at least two resource groups and resources included in each resource group;

determining reporting configuration of channel state information (CSI);

acquiring at least one CSI according to the resource configuration information and the reporting configuration;

sending a target CSI to a network device according to the at least one CSI, where the target CSI includes first information, and the first information indicates a target resource and a type of transmission mode recommended by a terminal, where the target resource includes: at least one resource or a combination of at least two resources.

The transceiver 610 is configured to receive and send data under the control of the processor 600.

In FIG. 6, the bus architecture may include any quantity of interconnected buses and bridges, specifically one or more processors represented by the processor 600 and various circuits of the memory represented by the memory 620 are linked together. The bus architecture can also link together various other circuits such as peripherals, voltage regulators, and power management circuits, etc., which are well known in the art and therefore will not be further described herein. The bus interface provides the interface. Transceiver 610 may be a plurality of elements, including a transmitter and a receiver, which provides a unit for communicating with various other apparatuses over transmission media, these transmission media include wireless channels, wired channels, fiber optic cables, and other transmission media. For different user equipments, the user interface 630 may also be an interface capable of connecting externally and internally to required device, and the connected device includes but not limited to a keypad, a display, a speaker, a microphone, a joystick, and the like.

The processor 600 is responsible for managing the bus architecture and general processing, and the memory 620 can store data used by the processor 600 when performing operations.

Optionally, the processor 600 may be a CPU (Central Processing Unit), ASIC (Application Specific Integrated Circuit, Application Specific Integrated Circuit), FPGA (Field-Programmable Gate Array, Field Programmable Gate Array) or CPLD (Complex Programmable Logic Device, complex programmable logic device), and the processor can also adopt a multi-core architecture.

The processor is used to execute any one of the methods provided by the embodiments of the present disclosure according to the acquired executable instructions by calling the computer program stored in the memory. The processor and memory may also be arranged physically separated.

Further, when the processor 600 executes the program of the acquiring resource configuration information for channel measurement, the following steps are implemented:

receiving, through the transceiver, grouping configuration information sent by the network device;

determining the resource configuration information for channel measurement according to the grouping configuration information.

Optionally, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Optionally, in a case that the grouping configuration information includes the QCL relationship of resources in the resource set for channel measurement, when the processor 600 executes the program of determining the resource configuration information for channel measurement according to the grouping configuration information, the following steps are implements:

determining, for a first resource and a second resource in the resource set for channel measurement, that the first resource and the second resource belong to a same resource group in a case that the first resource and the second resource have a first type of QCL relationship with a first reference signal;

where the first type includes one of the following:

Type A;

Type B;

Type C;

Type D;

Type A and Type D; or,

Type C and Type D.

Optionally, the grouping configuration information further includes: identification information indicating resources in a first resource group of the at least two resource groups to acquire CSI in a transmission mode of single-point transmission.

Optionally, configuration method of the reporting configuration includes at least one of the following:

network device configuration;

predefinition;

terminal reporting configuration; or, determination according to resource configuration information.

Optionally, the reporting configuration includes at least one of the following:

reporting at least one CSI acquired on the basis of a transmission mode of single-point transmission; or, reporting at least one CSI acquired on the basis of a transmission mode of multi-point transmission.

Optionally, a type of the transmission mode of multi-point transmission includes at least one of the following:

space division multiplexing (SDM);

frequency division multiplexing (FDM) mode A;

FDM mode B;

time division multiplexing TDM mode A;

TDM mode four; or, high-speed rail enhancement mode.

Optionally, a type of the transmission mode of single-point transmission includes at least one of the following:

dynamic transmission point selection (DPS);

DPS and single-point repeat transmission;

dynamic transmission point become silent (DPB); or,

DPB and single-point repeat transmission.

Optionally, in a case that the reporting configuration includes: reporting at least one CSI acquired on the basis of the transmission mode of multi-point transmission, when the processor 600 executes the program of the acquiring at least one CSI according to the resource configuration information and the reporting configuration, the following steps are implemented:

selecting at least two groups from the at least two resource groups, and selecting one resource from each group of the at least two groups to perform channel measurement respectively, and acquiring corresponding CSI.

Optionally, in a case that the reporting configuration includes: reporting at least one CSI acquired on the basis of the transmission mode of single-point transmission, when the processor 600 executes the program of acquiring at least one CSI according to the resource configuration information and the reporting configuration, the following steps are implemented:

selecting a second resource from a first resource to perform channel measurement, and acquiring corresponding CSI, where the first resource is all resources that can be used for CSIs acquired on the basis of the transmission mode of single-point transmission, or the first resource is all resources configured by the network device.

Optionally, in a case that the reporting configuration includes: reporting at least one CSI acquired on the basis of the transmission mode of single-point transmission, the target CSI includes $X_1$ first information, each of the first information is configured to identify one of combinations of $Y_1$ resources and $Z_1$ types of transmission modes of single-point transmission, or, each of the first information corresponds to one resource in one resource group;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

Further, in a case that each of the first information is configured to identify one of combinations of $Y_1$ resources and $Z_1$ types of transmission modes of single-point transmission, total number of bits occupied by the first information in the target CSI is: $X_1 \times \lceil \log_2 Y_1 Z_1 \rceil$.

Further, in a case that each of the first information corresponds to one resource in one resource group, the total number of bits occupied by the first information in the target CSI is: a sum of number of bits occupied by each resource group.

Specially, the number of bits occupied by each resource group is $\lceil \log_2 N_x \rceil$, and $N_x$ is a quantity of resources in the $x_{th}$ resource group.

Optionally, in a case that the reporting configuration includes: reporting at least one CSI acquired on the basis of the transmission mode of single-point transmission, the target CSI includes one first information, the first information is configured to identify $X_1$ combinations selected from combinations of $Y_1$ resources and $Z_1$ types of transmission modes of single-point transmission, or, the first information is configured to identify a combination of one resource selected from a plurality of resource groups respectively, where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

Further, in a case that the first information is configured to identify $X_1$ combinations selected from combinations of $Y_1$ resources and $Z_1$ types of transmission modes of single-point transmission, total number of bits occupied by the first information in the target CSI is:

$$\lceil \log_2 C_{Y_1 Z_1}^{X_1} \rceil,$$

where $$C_{Y_1 Z_1}^{X_1}$$

is a quantity of combinations of $X_1$ elements selected from $Y_1 Z_1$ elements.

Further, in a case that the first information is configured to identify the combination of one resource selected from the plurality of resource groups respectively, total number of bits occupied by the first information in the target CSI is: $\lceil \log_2 N_1, \ldots \times N_x \rceil$, where $N_1$ is a quantity of resources in a first resource group, and $N_x$ is a quantity of resources in the $x_{th}$ resource group.

Optionally, in a case that the reporting configuration includes: reporting at least one CSI acquired on the basis of the transmission mode of multi-point transmission, the target CSI includes $X_2$ first information, each of the first information is configured to identify one of combinations of $Y_2$ resource combinations and $Z_2$ types of transmission modes of multi-point transmission;

where $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

Further, total number of bits occupied by the first information in the target CSI is: $X_2 \times \lceil \log_2 Y_2 Z_2 \rceil$.

Optionally, in a case that the reporting configuration includes: reporting at least one CSI acquired on the basis of the transmission mode of multi-point transmission, the target CSI includes one first information, the first information is configured to identify $X_2$ combinations selected from the combinations of $Y_2$ resource combinations and $Z_2$ types of transmission modes of multi-point transmission;

where $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

Further, total number of bits occupied by the first information in the target CSI is:

$$\lceil \log_2 C_{Y_2 Z_2}^{X_2} \rceil,$$

where $$C_{Y_2 Z_2}^{X_2}$$

is a quantity of combinations of $X_2$ elements selected from $Y_2 Z_2$ elements.

Optionally, in a case that the reporting configuration includes: reporting at least one CSI acquired on the basis of the transmission mode of single-point transmission and reporting at least one CSI acquired on the basis of the transmission mode of multi-point transmission, the target CSI includes $X_1 + X_2$ first information, where each first information of $X_1$ first information is configured to identify one of the combinations of $Y_1$ resources and $Z_1$ types of transmission modes of single-point transmission, and each first information of $X_2$ first information is configured to identify one of the combinations of $Y_2$ resources and $Z_2$ types of transmission modes of multi-point transmission;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_1$, $Y_1$, $Z_1$, $X_2$, $Y_2$ and $Z_2$ are all positive integers.

Further, number of bits occupied by the first information in the target CSI is: $X_1 \times \lceil \log_2 Y_1 Z_1 \rceil + \times \lceil \log_2 Y_2 Z_2 \rceil$.

Optionally, in a case that the reporting configuration includes: reporting at least one CSI acquired on the basis of the transmission mode of single-point transmission and reporting at least one CSI acquired on the basis of the transmission mode of multi-point transmission, the target CSI includes one first information; the first information is configured to identify $X_1$ combinations selected from the combinations of $Y_1$ resources and $Z_1$ types of transmission modes of single-point transmission, and $X_2$ combinations selected from the combinations of $Y_2$ resource combinations and $Z_2$ types of transmission modes of multi-point transmission;

where $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_1$, $Y_1$, $Z_1$, $X_2$, $Y_2$ and $Z_2$ are all positive integers.

Further, the number of bits occupied by the first information in the target CSI is:

$$\lceil \log_2 (C_{Y_1 Z_1}^{X_1} C_{Y_2 Z_2}^{X_2}) \rceil,$$

where $$C_{Y_1 Z_1}^{X_1}$$

is a quantity of combinations of $X_1$ elements selected from $Y_1 Z_1$ elements; and $$C_{Y_2 Z_2}^{X_2}$$

is a quantity of combinations of $X_2$ elements selected from $Y_2 Z_2$ elements.

Specially, the first information is a channel state information reference signal resource indicator (CRI).

It should be noted here that the above-mentioned terminal device provided by the embodiments of the present disclosure can implement all the method steps implemented by the above-mentioned method embodiments, and can achieve the same technical effect. Parts and beneficial effects in this embodiment that are the same as those in the method embodiment will not be described in detail here.

An embodiment of the present disclosure further provides a computer-readable storage medium on which a computer program is stored, where when the computer program is executed by a processor, the steps of the method for reporting information applied to a terminal device are realized. The processor-readable storage medium may be any available medium or data storage device that can be accessed by a processor, which includes but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Figure 7:
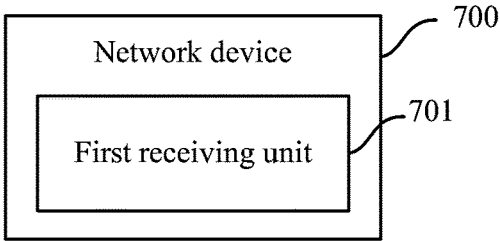
FIG. 7 shows a schematic view of units of a network terminal device according to an embodiment of the present disclosure.

As shown in FIG. 7, an embodiment of the present disclosure provides a network device 70, which includes:

a first receiving unit 71, configured to receive target channel state information (CSI) sent by the terminal device, where a target CSI includes first information, and the first information indicates a target resource and a type of transmission mode recommended by the terminal;

where the target resource includes: at least one resource or a combination of at least two resources;

the target CSI is determined by the terminal device according to resource configuration information for channel measurement and at least one CSI acquired by CSI reporting configuration, and the resource configuration information indicates at least two resource groups and resources included in each resource group.

Optionally, before the first receiving unit 71 receives the target channel state information CSI sent by the terminal device, further includes:

a second sending unit, configured to send grouping configuration information to the terminal device;

where the grouping configuration information is configured to determine the resource configuration information by the terminal device.

Optionally, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Further, the grouping configuration information further includes: identification information indicating resources in a first resource group of the at least two resource groups to acquire CSI in a transmission mode of single-point transmission.

It should be noted that this network device embodiment is a network device that corresponds one-to-one to the foregoing method embodiments, and all implementations in the foregoing method embodiments are applicable to this network device embodiment, and can also achieve the same technical effect.

It should be noted that the division of units in the embodiment of the present application is schematic, and is only a logical function division, and there may be another division manner in actual implementation. In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

If the integrated unit is realized in the form of a software function unit and sold or used as an independent product, the integrated unit can be stored in a processor-readable storage medium. Based on this understanding, the essence of the technical solution of this application or the part that contributes to the related technology or all or part of the technical solution can be embodied in the form of a software product, and the computer software product is stored in a storage medium. Several instructions are included to cause a computer device (which may be a personal computer, a server, or a network device, etc.) or a processor (processor) to execute all or part of the steps of the methods described in the various embodiments of the present application. The aforementioned storage media include: U disk, mobile hard disk, read-only memory (Read-Only Memory, ROM), random access memory (Random Access Memory, RAM), magnetic disk or optical disk and other media that can store program codes.

Figure 8:
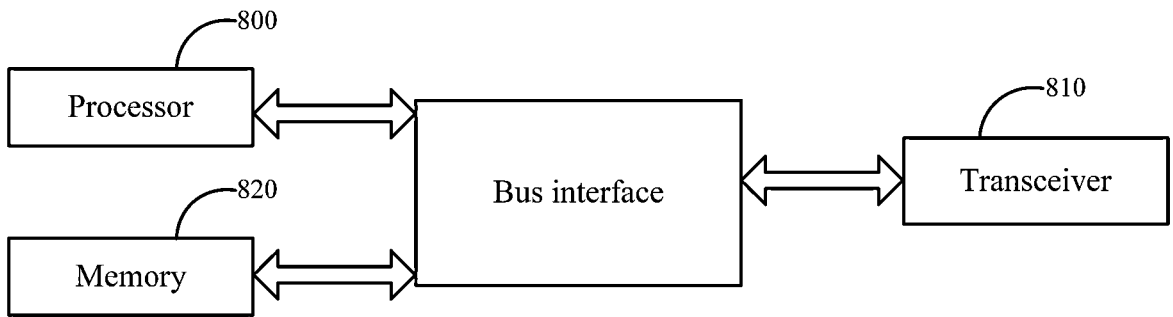
FIG. 8 shows a structural view of the network terminal device according to an embodiment of the present application.

As shown in FIG. 8, an embodiment of the present disclosure also provides a network device, which includes a processor 800, a transceiver 810, a memory 820, and a program stored in the memory 820 and operable on the processor 800; where the transceiver 810 is connected to the processor 800 and the memory 820 through a bus interface, where the processor 800 is configured to read the program in the memory and execute the following process of:

receiving, through the transceiver, target channel state information (CSI) sent by the terminal device, where a target CSI includes first information, and the first information indicates a target resource and a type of transmission mode recommended by the terminal;

where the target resource includes: at least one resource or a combination of at least two resources;

the target CSI is determined by the terminal device according to resource configuration information for channel measurement and at least one CSI acquired by CSI reporting configuration, and the resource configuration information indicates at least two resource groups and resources included in each resource group.

The transceiver 810 is configured to receive and send data under the control of the processor 800.

In FIG. 8, the bus architecture may include any quantity of interconnected buses and bridges, specifically one or more processors represented by the processor 800 and various circuits of the memory represented by the memory 820 are linked together. The bus architecture can also link together various other circuits such as peripherals, voltage regulators, and power management circuits, etc., which are well known in the art and therefore will not be further described herein. The bus interface provides the interface. Transceiver 810 may be a plurality of elements, including a transmitter and a receiver, which provides a unit for communicating with various other devices over transmission media, these transmission media includes wireless channels, wired channels, optical cables, and other transmission media. The processor 800 is responsible for managing the bus architecture and general processing, and the memory 800 can store data used by the processor 800 when performing operations.

The processor 800 may be a central processing unit (CPU), an application-specific integrated circuit (Application Specific Integrated Circuit, ASIC), a field-programmable gate array (Field-Programmable Gate Array, FPGA), or a complex programmable logic device (Complex Programmable Logic Device, CPLD), the processor may also adopt a multi-core architecture.

Further, before the processor 800 executes the program of receiving the target channel state information CSI sent by the terminal device, the following steps are also implemented:

sending, through the transceiver, grouping configuration information to the terminal device, where the grouping configuration information is configured to determine the resource configuration information by the terminal device.

Optionally, the grouping configuration information includes any of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

Further, the grouping configuration information further includes: identification information indicating resources in a first resource group of the at least two resource groups to acquire CSI in a transmission mode of single-point transmission.

What needs to be explained here is that the above-mentioned network device provided by the embodiments of the present disclosure can implement all the method steps implemented by the above-mentioned method embodiments, and can achieve the same technical effect. Parts and beneficial effects in this embodiment that are the same as those in the method embodiment will not be described in detail here.

An embodiment of the present disclosure also provides a computer-readable storage medium on which a computer program is stored, where when the computer program is executed by a processor, the steps of the information receiving method applied to a network device are implemented. The processor-readable storage medium may be any available medium or data storage device that can be accessed by a processor, which includes but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-state drive (SSD)), etc.

Those skilled in the art should understand that the embodiments of the present application may be provided as methods, systems, or computer program products. Therefore, the present application may take the form of an entirely hardware embodiment, an entirely software embodiment, or an embodiment combining software and hardware aspects. Furthermore, the present application may take the form of a computer program product embodied on one or more computer-usable storage media (including but not limited to disk storage and optical storage, etc.) having computer-usable program code embodied therein.

The present application is described with reference to flowcharts and/or block diagrams of methods, devices (systems), and computer program products according to embodiments of the present application. It should be understood that each process and/or block in the flowchart and/or block diagrams, and combinations of processes and/or blocks in the flowchart and/or block diagrams can be implemented by computer-executable instructions. These computer-executable instructions can be provided to a general purpose computer, special purpose computer, embedded processor, or processor of other programmable data processing device to produce a machine, such that instructions executed by the processor of the computer or other programmable data processing device produce an apparatus for realizing the functions specified in one or more processes of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product including instruction apparatus, the instruction apparatus realizes the function specified in one or more processes of the flowchart and/or one or more blocks of the block diagram.

These processor-executable instructions can also be loaded onto a computer or other programmable data processing device, which causes a series of operational steps to be performed on the computer or other programmable device to produce a computer-implemented processing, so that the instructions executed on the computer or other programmable devices thus provide steps for realizing the functions specified in one or more processes of the flowchart and/or one or more blocks of the block diagram.

Obviously, those skilled in the art can make various changes and modifications to the present application without departing from the spirit and scope of the present application. In this way, if these modifications and variations of the present application fall within the scope of the claims of the present application and their equivalent technologies, the present application is also intended to include these modifications and variations.

What is claimed is:

1. An information reporting method, performed by a terminal device, comprising:

acquiring resource configuration information for channel measurement, wherein the resource configuration information indicates at least two resource groups and resources comprised in each resource group;

determining reporting configuration of channel state information (CSI);

acquiring at least one CSI according to the resource configuration information and the reporting configuration;

sending a target CSI to a network device according to the at least one CSI, wherein the target CSI comprises first information, and the first information indicates a target resource and a type of transmission mode recommended by a terminal, wherein the target resource comprises: at least one resource or a combination of at least two resources.

2. The method according to claim 1, wherein the acquiring resource configuration information for channel measurement comprises:

receiving grouping configuration information sent by the network device;

determining the resource configuration information for channel measurement according to the grouping configuration information.

3. The method according to claim 2, wherein the grouping configuration information comprises any one of the following:

group identification information corresponding to each resource in a resource set for channel measurement;

a size of each resource group;

a bitmap corresponding to resources in the resource set for channel measurement;

Quasi-co-location (QCL) relationship of resources in the resource set for channel measurement.

4. The method according to claim 3, wherein in a case that the grouping configuration information comprises the QCL relationship of resources in the resource set for channel measurement, the determining the resource configuration information for channel measurement according to the grouping configuration information comprises:

determining, for a first resource and a second resource in the resource set of channel measurement, that the first resource and the second resource belong to a same resource group in a case that the first resource and the second resource have a first type of QCL relationship with a first reference signal;

wherein the first type comprises one of the following:

Type A;

Type B;

Type C;

Type D;

Type A and Type D;

Type C and Type D.

5. The method according to claim 1, wherein the reporting configuration comprises at least one of the following:

reporting at least one CSI acquired on the basis of a transmission mode of single-point transmission;

reporting at least one CSI acquired on the basis of a transmission mode of multi-point transmission.

6. The method according to claim 5, wherein a type of the transmission mode of multi-point transmission comprises at least one of the following:

space division multiplexing (SDM);

frequency division multiplexing (FDM) mode A;

FDM mode B;

time division multiplexing TDM mode A;

TDM mode four;

high-speed rail enhancement mode.

7. The method according to claim 5, wherein a type of the transmission mode of single-point transmission comprises at least one of the following:

dynamic transmission point selection (DPS);

DPS and single-point repeat transmission;

dynamic transmission point become silent (DPB);

DPB and single-point repeat transmission.

8. The method according to claim 5, wherein in a case that the reporting configuration comprises: reporting at least one CSI acquired on the basis of the transmission mode of multi-point transmission, the acquiring at least one CSI according to the resource configuration information and the reporting configuration comprises:

selecting at least two groups from the at least two resource groups, and selecting one resource from each group of the at least two groups to perform channel measurement respectively, and acquiring corresponding CSI.

9. The method according to claim 5, wherein in a case that the reporting configuration comprises: reporting at least one CSI acquired on the basis of the transmission mode of single-point transmission, the acquiring at least one CSI according to the resource configuration information and the reporting configuration comprises:

selecting a second resource from a first resource to perform channel measurement, and acquiring corresponding CSI, wherein the first resource is all resources that can be used for CSIs acquired on the basis of the transmission mode of single-point transmission, or the first resource is all resources configured by the network device.

10. The method according to claim 5, wherein in a case that the reporting configuration comprises: reporting at least one CSI acquired on the basis of the transmission mode of single-point transmission, the target CSI comprises $X_1$ first information, each of the first information is configured to identify one of combinations of $Y_1$ resources and $Z_1$ types of transmission modes of single-point transmission, or, each of the first information corresponds to one resource in one resource group;

wherein $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

11. The method according to claim 10, wherein in a case that each of the first information is configured to identify one of combinations of $Y_1$ resources and $Z_1$ types of transmission modes of single-point transmission, total number of bits occupied by the first information in the target CSI is: $X_1 \times \lceil \log_2 Y_1 Z_1 \rceil$.

12. The method according to claim 5, wherein in a case that the reporting configuration comprises: reporting at least one CSI acquired on the basis of the transmission mode of single-point transmission, the target CSI comprises one first information, the first information is configured to identify $X_1$ combinations selected from combinations of $Y_1$ resources and $Z_1$ types of transmission modes of single-point transmission, or, the first information is configured to identify a combination of one resource selected from a plurality of resource groups respectively, wherein $X_1$ is a quantity of CSIs acquired on the basis of the transmission mode of single-point transmission;

$Y_1$ is a quantity of resources that can be used for CSIs acquired on the basis of the transmission mode of single-point transmission;

$Z_1$ is a quantity of types of the transmission modes of single-point transmission;

$X_1$, $Y_1$ and $Z_1$ are all positive integers.

13. The method according to claim 12, wherein in a case that the first information is configured to identify $X_1$ combinations selected from combinations of $Y_1$ resources and $Z_1$ types of transmission modes of single-point transmission, total number of bits occupied by the first information in the target CSI is:

$$\lceil \log_2 C_{Y_1 Z_1}^{X_1} \rceil,$$

wherein $$C_{Y_1 Z_1}^{X_1}$$

is a quantity of combinations of $X_1$ elements selected from $Y_1 Z_1$ elements.

14. The method according to claim 5, wherein in a case that the reporting configuration comprises: reporting at least one CSI acquired on the basis of the transmission mode of multi-point transmission, the target CSI comprises $X_2$ first information, each of the first information is configured to identify one of combinations of $Y_2$ resource combinations and $Z_2$ types of transmission modes of multi-point transmission;

wherein $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

15. The method according to claim 14, wherein total number of bits occupied by the first information in the target CSI is: $X_2 \times \lceil \log_2 Y_2 Z_2 \rceil$.

16. The method according to claim 5, wherein in a case that the reporting configuration comprises: reporting at least one CSI acquired on the basis of the transmission mode of multi-point transmission, the target CSI comprises one first information, the first information is configured to identify $X_2$ combinations selected from the combinations of $Y_2$ resource combinations and $Z_2$ types of transmission modes of multi-point transmission;

wherein $X_2$ is a quantity of CSIs acquired on the basis of the transmission mode of multi-point transmission;

$Y_2$ is a quantity of resource combinations that can be used for CSIs acquired on the basis of the transmission mode of multi-point transmission;

$Z_2$ is a quantity of types of the transmission modes of multi-point transmission;

$X_2$, $Y_2$ and $Z_2$ are all positive integers.

17. The method according to claim 16, wherein total number of bits occupied by the first information in the target $$\lceil \log_2 C_{Y_2 Z_2}^{X_2} \rceil,$$

wherein $$C_{Y_2 Z_2}^{X_2}$$

is a quantity of combinations of $X_2$ elements selected from $Y_2 Z_2$ elements.

18. An information receiving method, performed by a network device comprises:

receiving target channel state information (CSI) sent by the terminal device, wherein a target CSI comprises first information, and the first information indicates a target resource and a type of transmission mode recommended by the terminal;

wherein the target resource comprises: at least one resource or a combination of at least two resources;

the target CSI is determined by the terminal device according to resource configuration information for channel measurement and at least one CSI acquired by CSI reporting configuration, and the resource configuration information indicates at least two resource groups and resources comprised in each resource group.

19. A terminal device, comprises a memory, a transceiver, and a processor, wherein the memory is configured to store computer programs; the transceiver is configured to send and receive data under the control of the processor; and the processor is configured to read the computer programs in the memory and perform the following operations of:

acquiring resource configuration information for channel measurement, wherein the resource configuration information indicates at least two resource groups and resources comprised in each resource group;

determining reporting configuration of channel state information (CSI);

acquiring at least one CSI according to the resource configuration information and the reporting configuration;

sending a target CSI to a network device according to the at least one CSI, 5 wherein the target CSI comprises first information, and the first information indicates a target resource and a type of transmission mode recommended by a terminal, wherein the target resource comprises: at least one resource or a combination of at least two resources. 10

20. A network device, comprises a memory, a transceiver, and a processor, wherein the memory is configured to store computer programs; the transceiver is configured to send and receive data under control of the processor; and the processor is configured to read the computer programs in the 15 memory and perform the information receiving method according to claim 18.

\* \* \* \* \*